United States Patent Office 3,449,021
Patented June 10, 1969

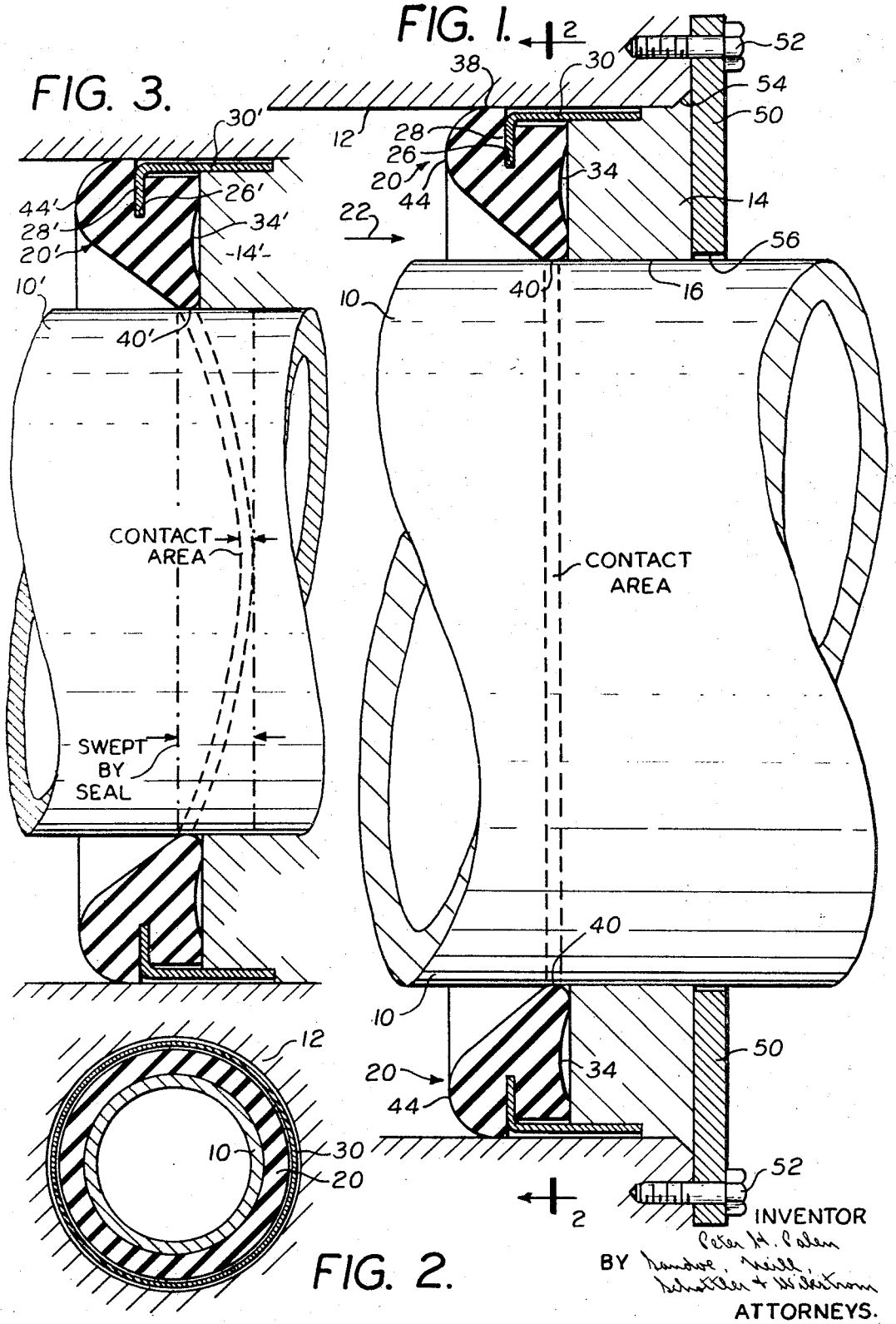

3,449,021
LOW FRICTION RESILIENT SEALING RING
Peter H. Palen, Lake Mohawk, N.J., assignor to C. E. Conover & Co., Inc., Caldwell, N.J., a corporation of New Jersey
Filed May 9, 1966, Ser. No. 548,727
Int. Cl. F16c 29/02, 17/02; F16j 15/16
U.S. Cl. 308—3.5                6 Claims

ABSTRACT OF THE DISCLOSURE

This seal assembly has an elastomer ring of novel shape for preventing escape of liquid or gas along a rotating or reciprocating shaft and for preventing entry of dust, dirt or other foreign matter from reaching a bearing. The sealing ring has a relatively short axial length of contact on the shaft, and the pressure is light so as to keep friction to a minimum. One embodiment has the area of contact with the shaft follow a wavy line so that it contacts with a substantial axial length of the surface of the shaft for each revolution of the shaft. The cross-section of the ring increases progressively as it extends radially away from the shaft so that the contact surface is supported against failure by spiralling, bunching, or tension fatigue. The area of contact of the ring on the shaft is offset axially from its center of mass and in a direction toward the pressurized side of the ring to obtain a reactive force against the ring.

Brief description of the invention

This invention relates to new and improved means of effecting fluid sealing between relatively moving parts, such as a shaft and a cooperating housing. The term "shaft" is used in a generic sense to include solid and hollow tubing and rods as well as pistons and other elements that move, with respect to a relatively fixed structure, with rotary, oscillating or reciprocating motion, or any combination of such motions.

It is an object of the invention to provide a substantially resilient annular ring seal of such configuration as to significantly reduce the friction forces at the sealing interface, and additionally to provide compensating means offsetting the considerable effect of pressure upon the friction forces, while maintaining leakproof conditions for either liquid or gas at high or low pressure.

It is another object to provide a sealing ring which has a small area of contact with the shaft for reducing friction and with the necessary resilience and pressure to effectively seal but with ample cross-section back from its region of contact so the ring is well supported against failure by spiralling, bunching, or tension fatigue.

According to one feature of the invention, the radial compressive force pushing the ring inward against the shaft is exerted in a plane that is offset toward the pressurized region with respect to reactive force of the shaft surface against the ring, and another feature provides a ring shape with a cross-section suitable for sealing a running clearance or a clearance of substantial radial extent between a shaft and a housing beyond a bearing in which the shaft moves. One aspect of the invention relates to the provision of the ring, a ring holder and gland, which serves as a bearing, with all of these parts provided as an integral cartridge which is an article of commerce.

Another object of the invention is to provide a sealing ring that contacts with the element it seals along a zone that is displaced axially as it extends circumferentially. The sealing point that is the furthest axially in the one direction and the sealing point that is the furthest axially in the other direction are at an axial spacing greater than the axial length of the "contact band" or "footprint" of the ring on the element with which the ring has its sealing contact. Preferably this distance is slightly greater than twice the actual length of the contact band so that any point on the rotating element within the area swept by the sealing ring during one full revolution of the element traverses the contact band at least once emerging between traverses on the pressurized or the unpressurized side of the ring as the case may be, to then be exposed and in direct contact with the fluid being sealed and/or the lubricating medium, if any, provided for seal break-in and low friction operation.

Other objects, features and advantages of the invention will appear or be pointed out as the description proceeds.

Brief description of drawing

In the drawing, forming a part hereof, in which like reference characters indicate corresponding parts in all the views:

FIGURE 1 is a diagrammatic sectional view showing a seal connected with a gland and located between a housing and a shaft which rotates in a bearing in the gland in accordance with this invention;

FIGURE 2 is a sectional view taken on the line 2—2 of FIGURE 1 but on a reduced scale; and FIGURE 3 is a fragmentary view, on a reduced scale, similar to FIGURE 1 but showing a modified form of the invention.

Description of preferred embodiment

FIGURE 1 shows a shaft 10 which rotates in a housing 12. A gland 14 fits into the housing 12 and has an opening which provides a bearing 16 for the shaft 10.

There is a sealing ring 20 located between the housing 12 and the shaft 10. This ring 20 seals the clearance between the housing and the shaft against leakage of fluid, for example fluid under pressure exerted in the direction of the arrow 22. This fluid under pressure may be either liquid or gas pressure.

The ring 20 is generally annular and has an outer peripheral surface in contact with the housing 12 and an inner peripheral surface in contact with the shaft 10. There is a circumferential annular groove 26 in the outer peripheral surface of the ring 20, and a disc 28 fits into this groove 26 and bottoms on the groove with some force so as to maintain the portion of the ring 20 which is under the disc 28, under some compression.

The upper limit of the disc 28 extends somewhat above the top of the annular groove 26 and is connected with a cylindrical retainer 30 which extends beyond the end of the ring 20 and across a reduced diameter portion of the gland 14. The retainer 30 is rigidly secured to the gland 14 and is preferably of one-piece construction with the disc 28.

The outside diameter of the retainer 30 is slightly less than the diameter of the opening in the housing 12, but the diameter of the ring 20 which is to the right of the disc 28 and within the confines of the retainer 30 so that this portion of the ring to the right of the disc 28 is not held under pressure by the retainer 30 and is free to move radially to some extent in response to differences in manufacturing tolerances of the shaft with which it is used.

The face of the gland 14, which confronts the ring 20, is preferably substantially normal to the longitudinal axis of the shaft 12 and the face of the ring 20 is substantially parallel to this confronting face of the gland 14 except for an annular recess 34 in the right hand face of the ring 20.

The purpose of this recess 34 is to act as a lubrication reservoir for pumping into the sealing zone at each reapplication of pressure to the ring. The provision of this recess reservoir 34 is an optional feature of the invention and is made possible by virtue of the essentially flat end face of the ring 20 which is used with the invention.

The ring 20 contacts firmly with the housing 12 at a zone 38 to the left of the disc 28 and this provides a static seal for preventing leakage of fluid between the ring 20 and the bore of the housing 12. At the inner peripheral surface of the ring 20, the ring contacts with the shaft 10 at a "dynamic interface" 40 where the ring 20 contacts lightly with the shaft but there is motion between the shaft and the ring.

The ring 20 does not move with respect to the housing 12, retainer 30 or gland 14, because of the large areas of contact of the ring 20 with these stationary parts. The pressure of fluid against the ring 20 increases its friction against the housing, retainer and gland. In the embodiment of the invention described herein, this motion is a rotary motion, but it will be understood that it can be merely oscillating motion or reciprocating motion or a combination of such motions. It should also be understood that the invention can be reversed and that if the ring 20 is to have a dynamic interface with the housing 12, the contour of the ring 20 is merely reversed so that the static seal is against the shaft 10 and the ring 20 is made to move as a unit with the shaft 10. This is merely a reversal of parts to accommodate the fact that the moving and stationary parts of the assembly have been interchanged.

The portion of the ring 20 which contacts with the shaft 10 at the interface 40 is a protuberance which is rounded to a radius of curvature having an angular extent in excess of 90°, when the ring is undistorted. When the shaft and ring are in working relation with one another, there is some distortion of the ring at the interface 40 though the protuberance at the inner end of the ring is thin enough, in an axial direction, to have flexibility and only light friction against the shaft 10.

It is a well-known fact that sealing friction is roughly proportional to the "footprint" of the seal at the dynamic interface, or, in this case, the impression of the seal ring 20 on the shaft 10. Therefore, for minimum friction, it is desirable to use the smallest practical cross-section for the sealing edge. However, the very resiliency which is desirable for seal-to-shaft conformity and thus assure good sealing qualities requires that the seal be of greater substance than a diminutive band such as an O-section having the radius of the protuberance of the ring 20 at the interface 40. Such a ring would fail by spiralling, bunching, or tension fatigue. The present invention provides the desired slimness at the sealing edge, while assuring ample support therefor by a substantial amount of back-up material extending outward to a protuberance 44 where the ring 22 reaches its maximum axial length near the region of its static sealing in the bore of the housing 12.

It is also a well-known fact that a seal must be initially loaded or pressed into firm contact with the cooperating surface at the sealing interface in order to assure leak tight operation. In resilient seals, this is commonly accomplished by fabricating the ring with a radial cross-section slightly greater than the confining space where it is installed, the point of compression at the outside diameter of the ring and at the inside diameter being substantially in a radial plane, that is to say, in line with each other. In the present invention, the cross-section squeeze is effected at points offset from each other and furthermore through the particular configuration of the present invention, the amount of loading at the inside diameter and at the outside diameter are controlled substantially independently.

The inside diameter loading is controlled by the compression force exerted by the disc 28 bottoming in the annular channel 26. This point is offset from the dynamic seal region 40 by approximately one-half of the axial length of the ring. Furthermore, the outside diameter portion of the ring which is radially outward from the dynamic interface 40 is not closely confined since it has a clearance from the surrounding retainer 30 as previously explained.

In rings made from elastomers, the internal pressure and therefore the contact stress at the sealing region increases in proportion to the pressure of the fluid being sealed. In such common designs as O-rings or X-rings, there occurs additionally under fluid pressure a deformation of the cross-section, as the ring is being "stuffed" into the furthest corners of the confining groove, which tends to (1) enlarge the footprint and, (2) increase the loading pressure at the dynamic interface, both factors contributing to increased operating friction. In the present invention, these effects are offset by the slight clearance existing between the ring and the retainer 30 which surround the ring radially outward from the dynamic interface. It has been proven by actual tests, that the friction force increases negligibly or may even be slightly reduced through the application of increasing fluid pressure on a ring of the configuration shown in FIGURE 1.

The outside diameter seal, which occurs at the protuberance 44 where it curves into contact with the housing 12 at the region 38, is connected to the remainder of the body of the ring by a substantially conical section and is further offset away from the plane of the dynamic seal 40. The conical section extending from the protuberance 44 extends downward and merges with the protuberance at the inner periphery of the ring 20 which touches the shaft at the dynamic interface 40.

Radial distortion required to assure sealing at the region 38 is obtained through deflection of the conical section of the ring which forms the protuberance 44 rather than any reaction from the sealing edge which touches the dynamic interface 40. Consequently, minor variations in the amount of distortion resulting from manufacturing tolerances of the bore of the housing 12 exert virtually no effect on the amount of pressure, which is critical in the control of friction, at the dynamic interface 40. This advantage enables the ring manufacturer to reduce seal distortion at the critical edge which touches at the dynamic interface far below the limit that would be considered safe for tolerance take-up in rings of more common cross-section. Since the ring manufacturer has direct control over the proportions of the disc 28, the only variable which must be accommodated in sizing the ring inside diameter is the shaft tolerance. Generally speaking, shaft or piston dimensions and finishes are held closely often for reasons bearing no relation to the sealing function.

In FIGURE 1 the disc 28 is made part of the retainer 30 which is in turn secured to the gland 14 and this unit with the ring 20 can be sold as an assembly and as a separate article of commerce. The assembly is inserted into the bore of the housing 12 and is held against outward pressure in the direction of the arrow 22 by a plate 50 attached to the housing by detachable fastening means, here shown as screws 52. In the illustrated construction, the gland 14 has a tapered flange 54 which seats against a countersunk edge at the end of the bore in the housing 12. An opening 56 through the plate 50 is preferably somewhat larger in diameter than the shaft 10 so that the plate 50 does not provide a bearing for the shaft.

The ring 20 is preferably made of polytetrafluoroethylene bearing Buna, or Butyl, or Viton elastomer depending upon service requirements. These materials develop a glaze of the polytetrafluoroethylene at the interface 40 extending the service life by as much as two to one over the more common elastomers. Many other materials can be used and the particular plastics mentioned above are merely by way of illustration.

FIGURE 2 shows a modified form of the invention in which the ring extends in a direction other than a plane at right angles to the longitudinal axis of the shaft 10. In accordance with this feature, the sealing point of the ring which is furthest to the right axially on the shaft and the sealing point which is furthest to the left axially, are at an axial spacing greater than the axial width of the "contact band" or "footprint" of the ring 20′ on the shaft 10′ under any normal operating conditions, and in the preferred embodiment of the invention, the distance is greater than twice the axial width of said contact band or footprint. In this preferred configuration, any point on the shaft within the area swept by the seal during one full revolution of the shaft traverses the contact band of the seal at least once, emerging between said traverses either on the pressurized or the unpressurized side of the seal, as the case may be, to then be exposed and in direct contact with the fluid being sealed and/or the lubricating medium, if any, provided for seal break-in and low friction operation. This spacing may be obtained by merely having the dynamic interface in a plane which is canted with respect to the longitudinal axis of the shaft; but it is preferably obtained by having the seal follow a V track which extends axially toward one end of the shaft around a phase angle of 90° and then back toward the other end of the shaft by an equal amount for the following phase angle of 90°, the path being repeated for the remaining path of the circumference of the seal ring 20′. In FIGURE 3 the result is obtained by having a shape of the ring 20′ which gives it a sinusoidal track when developed by unrolling the shaft surface. This shape is shown in FIGURE 3. There is a progressive displacement of the dynamic interface toward the right for 90° and then toward the left for the next 90° during each half revolution of the shaft 10′.

The following benefits are obtained from the construction of the seal so that the point of sealing, in effect, moves axially along the shaft as the shaft rotates.

(a) There is a constant "re-wetting" effect on the shaft surface swept by the seal that maintains the fluid film at the shaft seal interface, a provision that is not available in conventional radial seals that operate without a constant bleeding type of leakage. Conventional leak-proof seals are, therefore, severely limited by their pressure-velocity rating since the breakdown of the lubricating film at the critical interface causes a rapid heat build-up and a progressive spiralling degradation of the seal ring and/or shaft.

(b) Heat which is unavoidably generated at the shaft seal interface, particularly severe at high pressure-velocity operation, is distributed throughout the swept area, which, as stated above, is greater than at least twice the area available in conventional radial designs.

(c) Because the swept area of the shaft is alternately in and then out of the sealing zone, a significant transfer of heat takes place directly from the surface of the shaft that has just rubbed past the seal and there becomes heated. As that same portion of the shaft surface re-enters the seal, it is cooler by virtue of conduction into the fluid medium being sealed or into the gland that backs up the sealing ring. The resulting lower operating temperature means that the invention is capable of being applied to cases considerably beyond the reach of conventional radial seal designs, or, as a corollary, to greatly extend the useful operating life of a radial seal application.

(d) Because of the extended service made possible as described in paragraphs (a)–(c) above, the seal of this invention may often replace elements of the generic type known to those skilled in the art as "face seals," providing all of the advantages of the radial configuration, namely in particular complete axial freedom with respect to the shaft, absence of collars or the like to drive the rotating member of the face seal, with attendant shaft modifications, such as shoulders, grooves, lock screws, etc., absence of secondary seals, absence of attaching means for the secondary element of the seal. Cost savings are effected not only in the basic price of the seal element itself, but also in the machine configuration of both the housing and shaft, and finally in a much simpler or looser control over the positioning of the shaft in the housing (axially).

The preferred embodiments of the invention have been illustrated and described. Terms of orientation are, of course, relative. Changes and modifications can be made and some features can be used in different combinations without departing from the invention as defined in the claims.

What is claimed is:

1. A seal assembly including a first and second element which elements have confronting cylindrical surfaces with concentric longitudinal axes and that have relative movement with respect to one another and radial clearance between said cylindrical surfaces, which clearance is to be sealed against leakage of fluid axially along said clearance, a ring located between said elements and extending across the clearance, said ring being generally annular and having inner and outer peripheral surfaces at its opposite radial limits and which contact with the respective elements, one of the peripheral surfaces of the ring being of substantially greater axial length than the other and having a portion near one end only in contact with the first of said elements, and the other peripheral surface of the ring having a portion of the other end and only said other end in contact with the second of said elements, a holder securing the ring to the first of the elements and connected to the ring intermediate the ends thereof the greater length peripheral surface of the ring having an annular groove therein at a location intermediate the end faces of the ring, the holder comprising an annular disc that fits into the groove and that bottoms in the groove to maintain the ring under some compression radially towards the second of said elements, a hollow cylindrical retainer connected with one circumference of the annular disc, the ring on the side of the disc opposite the retainer being the peripheral surface that contacts with the first of said elements, and the ring on the same side of the disc as the retainer terminating radially before reaching said first of said elements, said retainer extending axially beyond the end of the ring and being secured to structure that holds the ring in its proper axial relation to the element that has relative movement with respect to the ring.

2. The seal assembly described in claim 1 characterized by the ring being polytetrafluoroethylene bearing elastometric material, and the element that contacts with the inner periphery of the ring being a shaft and the element that contacts with the outer periphery of the ring being a housing, a gland located between the shaft and the housing for a portion of the axial distance along the length of said shaft and housing, the gland spanning a clearance between the shaft and the housing except for running clearance between the shaft and the inside of the gland that serves as a bearing for the shaft, detachable fastening means retaining the gland within the housing, the ring fitting the space between the shaft and housing at the inner end of the gland and contacting with both the shaft and the housing, the ring having an end face in contact with an end face of the gland and extending in one direction generally normal to a plane through the axis of the shaft, and the short length peripheral surface of the ring being in contact with the shaft adjacent to said end face of the gland, the ring having its maximum diameter area of the surface of the longer peripheral surface in contact with the housing on the side of the disc opposite the retainer, the ring and face of the gland being displaced further and further progressively along the axis of the shaft as they extend angularly around the axis of the shaft up to a given phase angle and then being displaced progressively back along the axis of the shaft as they extend angularly to complete a total phase angle that restores the parts to their original relative axial positions whereby the footprint of the ring on the shaft follows a generally sinusoidal curve and the contact of the ring with the housing is along a similar curve.

3. A sealing ring of elastometric material and having end faces and inner and outer peripheral surfaces at its opposite radial limits for contact with elements, one of which moves with respect to the other, said elements having clearance between them that is to be sealed by said ring, one of the peripheral surfaces of the ring being of substantially greater axial length than the other, the peripheral surface of the lesser length being a short and flexible portion that contacts with the movable element with which the ring is used as a seal, the areas of contact of said inner and outer peripheral surfaces being axially offset from one another, and characterized by said flexible portion of the ring having a surface with a curvature in an axial plane when undistorted, and the axial length of the cross-section of the ring increasing as it extends away from the surface of said flexible portion to an axial length that is many times greater than the radius of said curvature of the surface of said flexible portion and characterized by the first end face of the ring extending radially and generally normal to a plane through the axis of the ring but with a concave annular depression therein across part of the radial extent of said first end face, and the second end face diverging away from the axis of the ring as it extends axially away from the first end face and having a protuberance thereon at which the cross-section of the ring reaches its maximum axial length, the said protuberance being curved and extending back toward the first end face of the ring at the longer peripheral surface of the ring.

4. The sealing ring described in claim 3 characterized by the ring having an annular groove therein at a location intermediate the end faces of the ring, and annular disc that fits into the groove and that bottoms in the groove to maintain the ring under some compression radially inward from the disc, a hollow cylindrical retainer connected with the top of the disc above the top of the annular groove, the diameter of the ring on the side of the disc opposite the retainer being greater than the outside diameter of the cylindrical retainer, and the diameter of the ring on the same side of the disc as the retainer being less than the inside diameter of the cylindrical retainer, said retainer extending axially beyond the end of the ring for connection with a structure to hold the ring in place.

5. The sealing ring described in claim 3 characterized by the material of the ring being a polytetrafluoroethylene bearing elastomer and a projection of the ring on a plane normal to its longitudinal axis being of generally circular shape, but the ring having a contour with axial changes in direction that give the circumference a cyclic path whereby the part of the ring that contacts with a relatively movable cylindrical element to effect a seal makes that contact at points that are displaced progressively further in one direction axially through a given phase angle and then progressively in the opposite direction axially through a following phase angle so that the region of contact of the ring with the rotating shaft shifts axially with regard to each part of the shaft to wash and cool said shaft.

6. The ring described in claim 3 characterized by the peripheral surface of greater axial length to the ring having an annular groove therein at a location intermediate the end faces of the ring and intermediate the areas of contact that are toward the opposite ends of the ring, an annular disc that fits into the groove and that bottoms in the groove to maintain the ring under some compression radially inward from the disc, a hollow cylindrical retainer connected with the top of the disc above the top of the annular groove, the diameter of the ring on the side of the disc opposite the retainer being greater than the outside diameter of the cylindrical retainer, and the diameter of the ring on the same side of the disc as the retainer being less than the inside diameter of the cylindrical retainer, said retainer extending axially beyond the dynamic sealing end of the ring, a gland beyond the ring and to which the retainer is connected for holding the ring against axial displacement, the gland having an opening therein with a bearing surface for a shaft that is to be sealed by said ring, the ring, disc, retainer and gland constituting a composite cartridge that is an article of commerce.

References Cited

UNITED STATES PATENTS

| | | | |
|---|---|---|---|
| 2,587,405 | 2/1952 | Stevens | 277—181 |
| 2,968,498 | 1/1961 | Saunders | 277—183 X |
| 3,200,615 | 8/1965 | Stokely | 277—181 X |
| 3,330,605 | 7/1967 | Jasmand | 308—36.1 |
| 3,343,894 | 9/1967 | Fisher | 308—187.2 |
| 3,362,719 | 1/1968 | McCormick | 277—183 X |
| 2,467,210 | 4/1949 | Helfrecht | 277—235 |
| 2,509,151 | 5/1950 | Kasten | 277—235 |
| 2,647,777 | 8/1953 | Kosatka | 277—178 |
| 2,708,374 | 5/1955 | Engh. | |
| 2,873,153 | 2/1959 | Haynie | 308—187.2 |
| 2,962,329 | 11/1960 | Moore | 308—187.1 |
| 3,025,716 | 3/1962 | Muller | 277—212 X |
| 3,104,916 | 9/1963 | Dowling | 308—3.5 |
| 3,166,360 | 1/1965 | Amelung | 308—3.5 |
| 3,195,902 | 7/1965 | Tisch | 277—207 X |
| 3,235,271 | 2/1966 | Johnson | 277—152 X |
| 3,284,145 | 11/1966 | Bixby | 277—178 |
| 3,311,430 | 3/1967 | Christensen | 308—187.1 |

FOREIGN PATENTS

| | | |
|---|---|---|
| 555,100 | 8/1943 | Great Britain. |
| 996,365 | 6/1965 | Great Britain. |
| 101,381 | 4/1962 | Netherlands. |

MARTIN P. SCHWADRON, *Primary Examiner.*

LUCIOUS L. JOHNSON, *Assistant Examiner.*

U.S. Cl. X.R.

277—183, 237; 308—36.1